No. 799,174. PATENTED SEPT. 12, 1905.
R. C. LOWRY & F. A. REYNOLDS.
BUNDLING MACHINE.
APPLICATION FILED MAY 8, 1905.

5 SHEETS—SHEET 1.

Witnesses
Jas E Hutchinson
Chas. J. O'Neill

Inventors
Robert C. Lowry
Frank A. Reynolds
by Pennie & Goldsborough
Attorneys

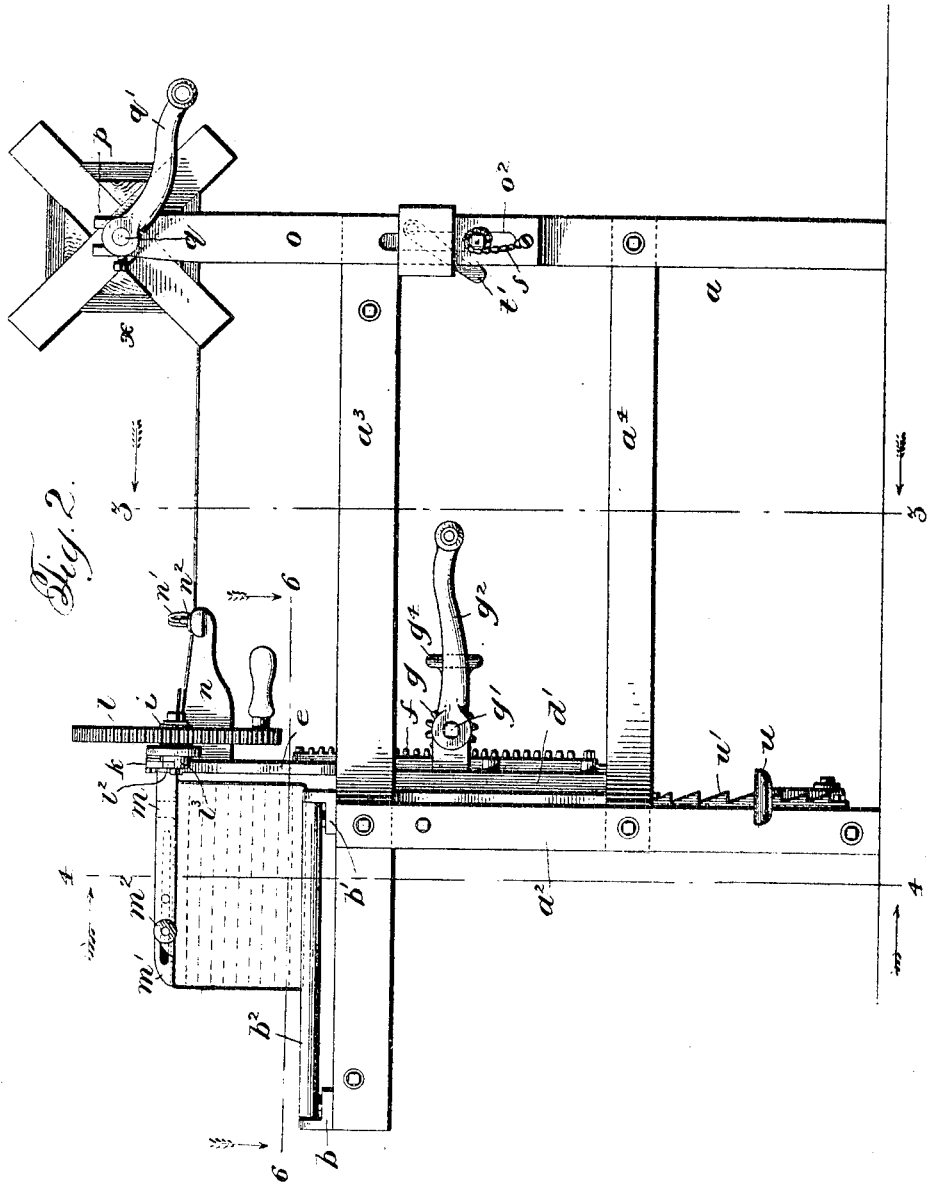

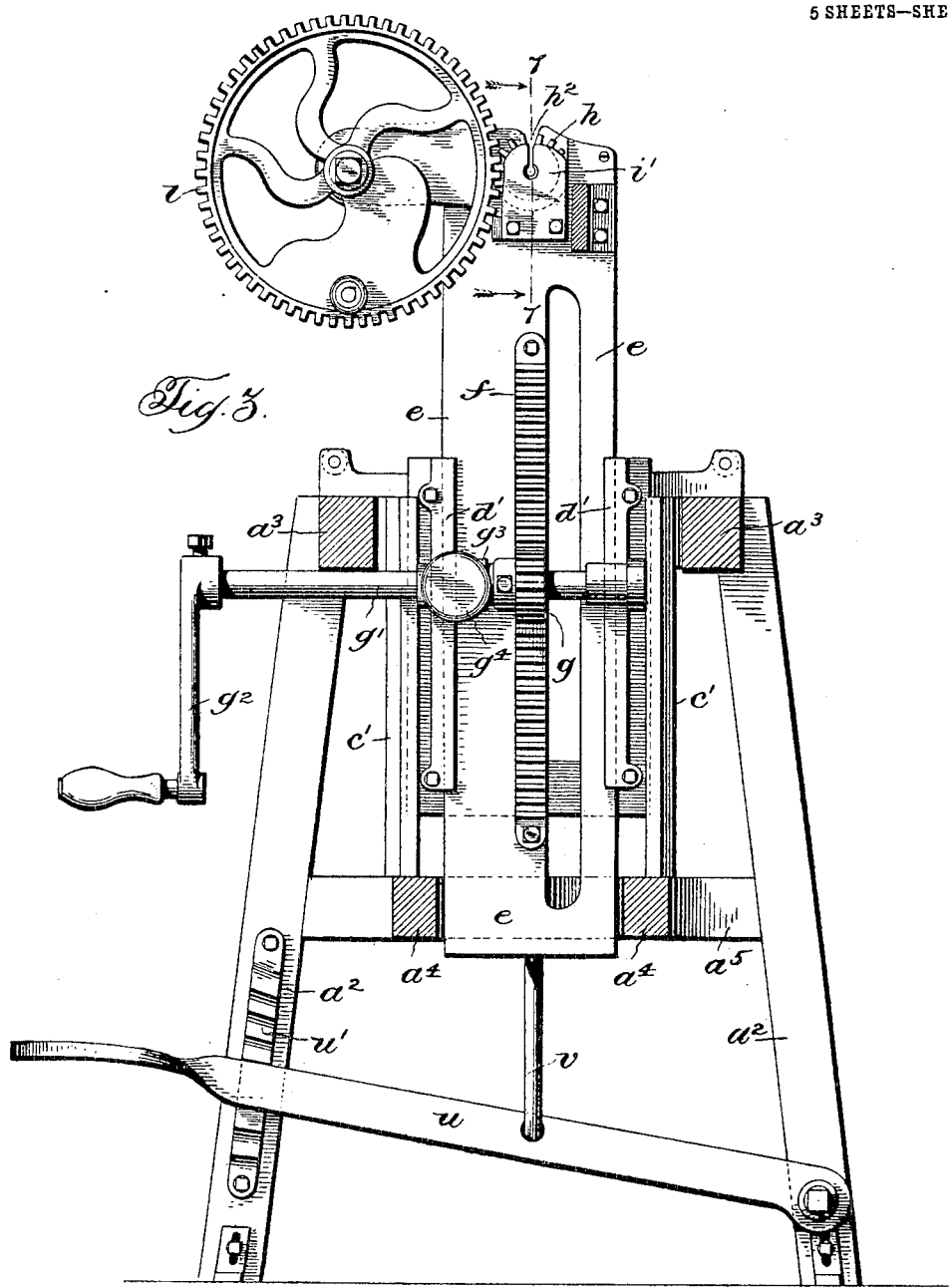

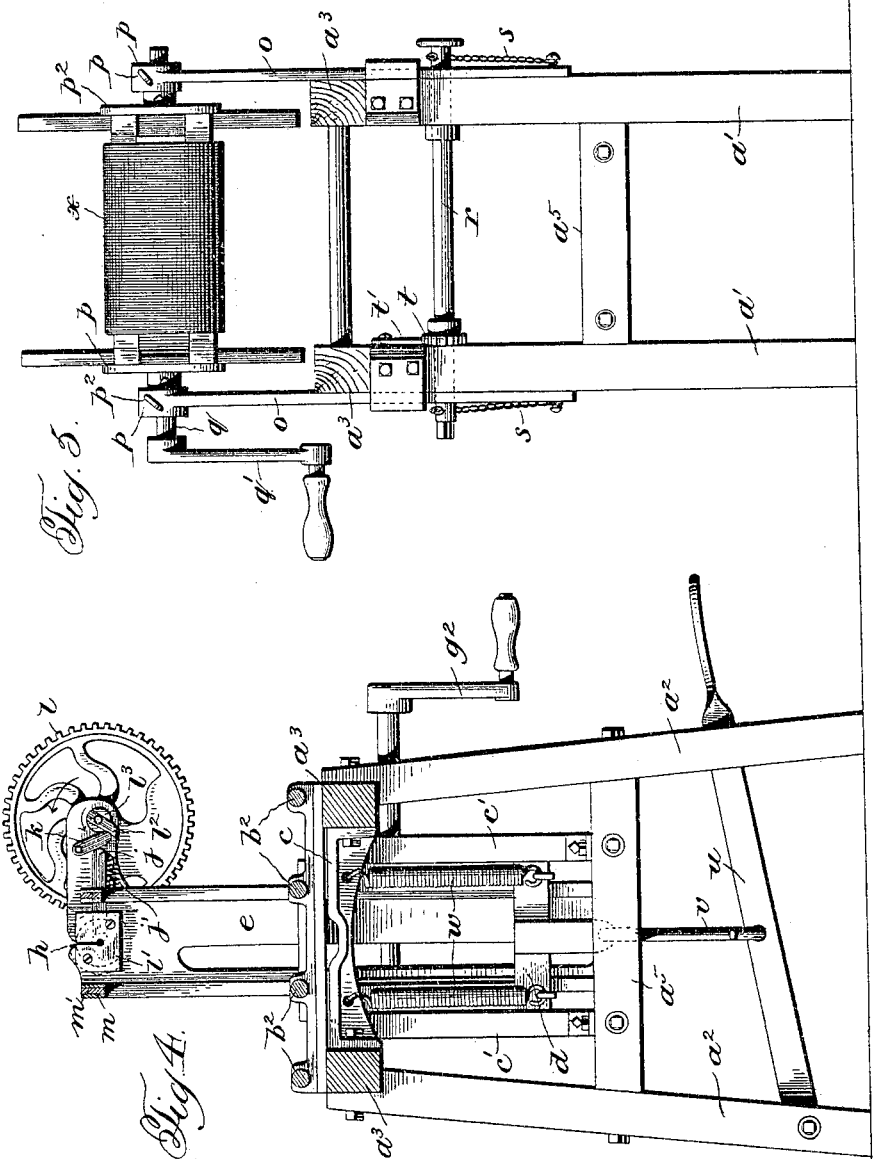

No. 799,174. PATENTED SEPT. 12, 1905.
R. C. LOWRY & F. A. REYNOLDS.
BUNDLING MACHINE.
APPLICATION FILED MAY 8, 1905.

5 SHEETS—SHEET 5.

Witnesses
Jas. E. Hutchinson
Chas. J. O'Neill

Inventors
Robert C. Lowry
Frank A. Reynolds
by Jennie Goldsborough
Attorneys

UNITED STATES PATENT OFFICE.

ROBERT C. LOWRY, OF NEW YORK, N. Y., AND FRANK A. REYNOLDS, OF AUBURN, MAINE; SAID REYNOLDS ASSIGNOR TO SAID LOWRY.

BUNDLING-MACHINE.

No. 799,174.        Specification of Letters Patent.        Patented Sept. 12, 1905.

Application filed May 8, 1905. Serial No. 259,398.

*To all whom it may concern:*

Be it known that we, ROBERT C. LOWRY, residing at New York, State of New York, and FRANK A. REYNOLDS, residing at Auburn, State of Maine, citizens of the United States, have invented certain new and useful Improvements in Bundling-Machines; and we do hereby declare the following to be a full, clear, and exact description of the invention, such as will enable others skilled in the art to which it appertains to make and use the same.

The invention relates to bundling-machines, and has for its object to provide a simple, strong, and efficient apparatus for binding or tying bundles of lathes, box-shooks, and loose stock in the form of strips or blanks with wire, said apparatus comprising a special form of table for supporting the bundle; an adjustable support for the twister, which support also is provided with clamping-arms to hold the bundle on the table; a sliding frame in which said support is mounted, together with means for moving the support in the frame to adjust the height of the twister and also for moving the frame and support together to clamp the bundle upon the table and bring the twister into proper operative relation with respect to the bundle; means for holding the frame and support in adjusted position; means for operating the twister and for severing the twisted wire and adjustable reel-supports, which are capable of being moved up and down on the machine-frame to deliver the wire taken from the reel in substantial alinement with the twister in the various adjusted positions of the latter.

Figure 1:
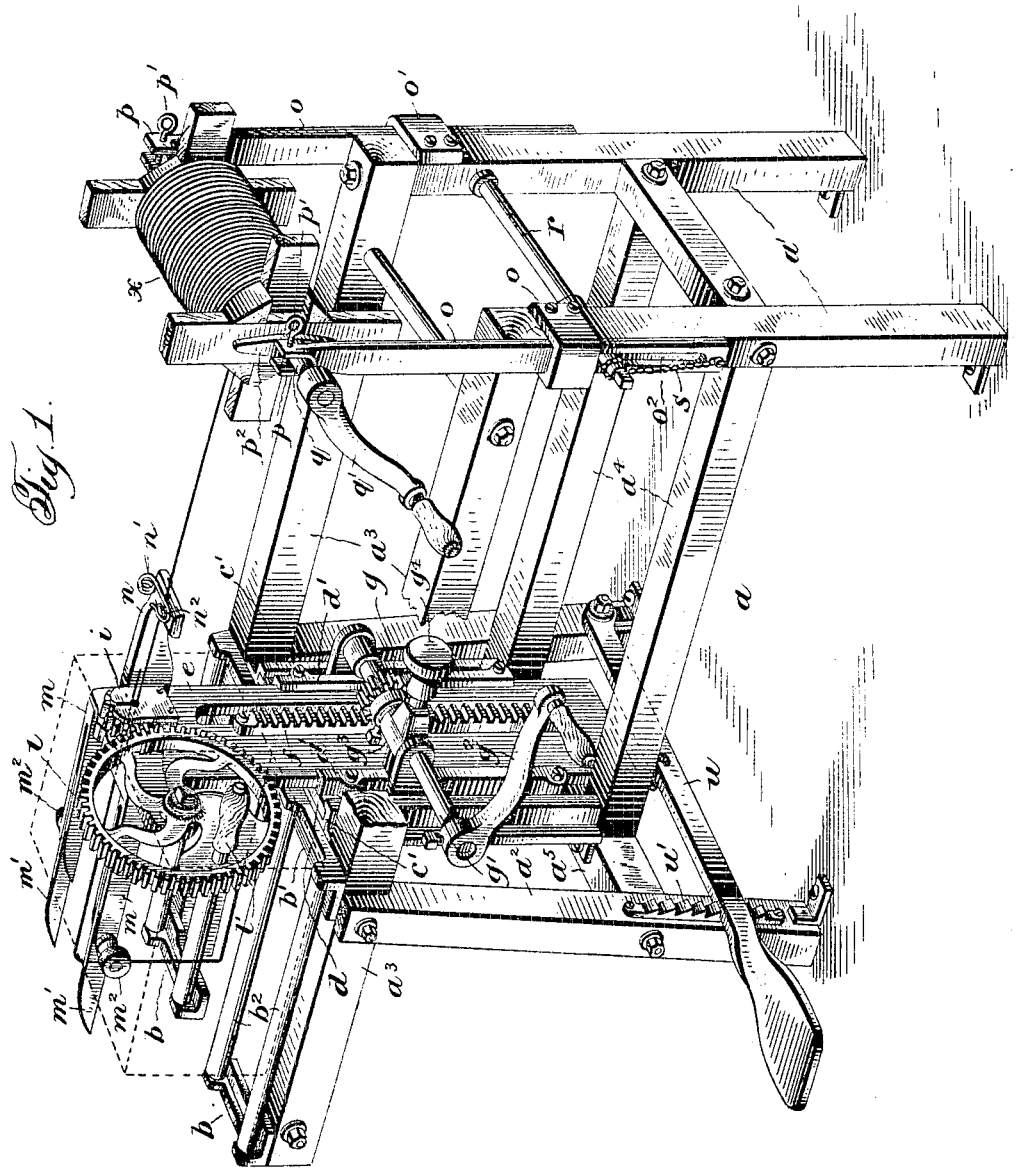
Figure 6:
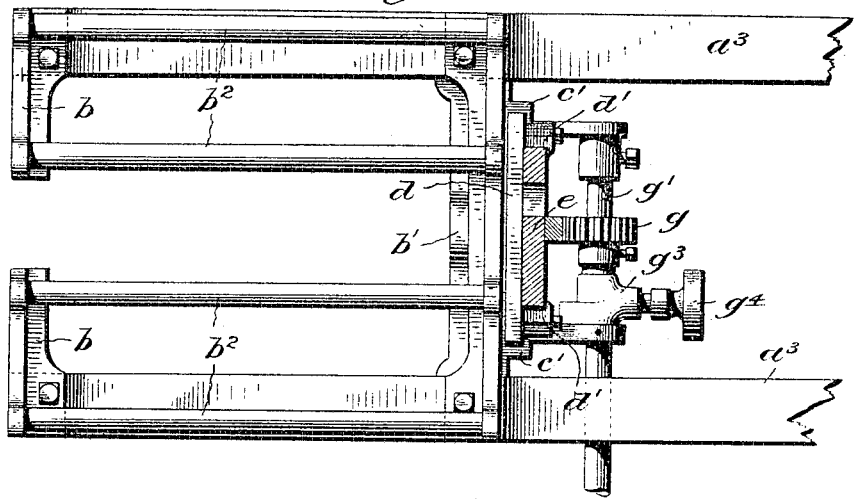
Figure 7:
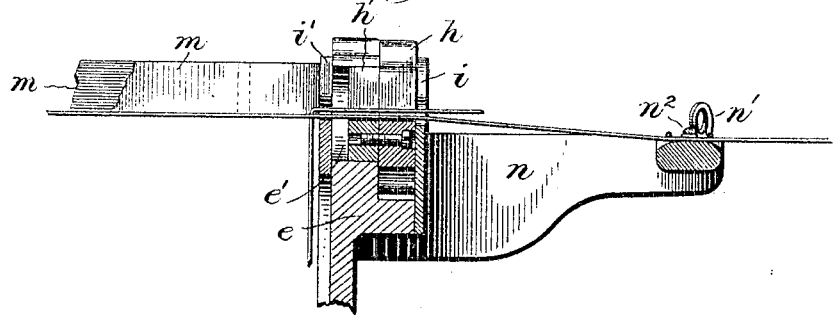
Figure 8:
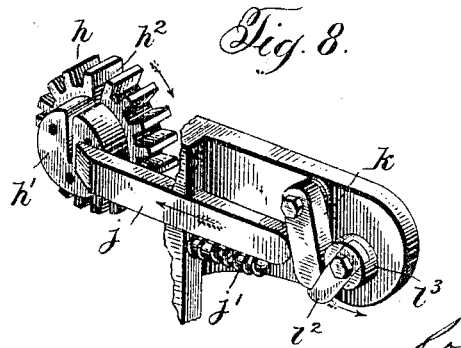

In the accompanying drawings, Figure 1 is a perspective view of a machine embodying the invention, a portion of the framework be being broken away to more clearly show the operating mechanism. Fig. 2 is a side elevation thereof. Fig. 3 is a vertical section on line 3 3 of Fig. 2 looking from the right. Fig. 4 is a similar section on line 4 4 of Fig. 2 looking from the left. Fig. 5 is a rear elevation. Fig. 6 is a plan view of the forward part of the machine, showing portions of the mechanism in horizontal section. Fig. 7 is a section on line 7 7 of Fig. 3. Fig. 8 is a fragmentary perspective showing the twister, the knife, and the mechanism for operating the latter.

Referring to the drawings, $a$ indicates the frame of the apparatus, and consists of the end uprights $a'$ $a^2$, upper longitudinal members $a^3$, and lower longitudinals $a^4$, the whole constituting a rigid frame or support upon which the operating mechanism is mounted. The upper longitudinals $a^3$ are prolonged beyond the front legs or standards $a^2$ and constitute the support for the table upon which the bundles are placed for the tying operation. In its preferred form the table consists of a series of longitudinal rollers $b^2$, journaled in brackets $b$ $b'$, mounted upon the top of the longitudinal frame members $a^3$, the front bracket $b$ being divided at its middle portion to allow a clear space between the middle rollers.

Secured between the longitudinals $a^3$ and substantially in the plane of the forward standards $a^2$ is a bridge-piece $c$, from which depends two vertical metal bars $c'$, attached at their lower ends to the cross-brace $a^5$ of the machine-frame. Each of said bars $c'$ is provided with a longitudinal groove which constitutes a guide for a rectangular metal frame $d$, to the front face of which are secured two parallel guides $d'$. Slidably mounted in the guides $d'$ is a support for the wire-twister and its operating mechanism, said support consisting of a substantially flat metal plate $e$, having reinforcing-flanges along its vertical edges which engage with the guides $d'$. The upper end of the support $e$ is provided with a transverse journal-bearing $e'$ to receive the rotary cutter, and above the bearing the support is provided with a slot which opens into the bearing.

The twister, which is rotatably supported in the bearing above referred to, consists of a circular disk $h$, provided with peripheral gear-teeth and having a radial slot $h^2$, which is adapted to be brought into registry with the slot in the twister-support. Secured to the front face of the disk $h$ is a smaller disk $h'$, likewise provided with a radial slot registering with that in the toothed disk, and said disk $h'$ is journaled in the bearing $e'$, in which it is held against endwise movement by a faceplate $i$, secured to the support $e$ and likewise provided with a vertical slot which terminates in an orifice in alinement with the center of the twister. Mounted upon the lateral arm of the support $e$ is a gear-wheel $l$, meshing with the gear-teeth on the twister and serving to impart a rotary motion to the latter when said gear-wheel $l$ is driven by the handle $l'$, provided for that purpose.

Mounted in a horizontal slot or guideway near the top of the support $e$ is a reciprocatory knife $j$, the cutting edge of which in its forward movement intersects the axis of the twister. The knife $j$ is normally retracted by means of a helical spring $j''$, which is confined between suitable lugs located on the under side of the knife and the adjacent wall of the support $e$, as clearly illustrated in Fig. 8. Forward movement is imparted to said knife $j$ by means of a wiper-cam $l^2$, secured in a slot in the end of the shaft $l^3$ of the gear $l$, and a pendular lever $k$, pivoted to the support $e$ between the end of the knife $j$ and the cam $l^2$. The operating-face of the cam $l^2$ is curved so that when the gear-wheel $l$ is driven in a forward direction said cam is rotated with the gear and engages the lever $k$, forcing the latter to the left and moving the knife $j$ transversely of the axis of the twister to sever the wire. The opposite face of the cam $l^2$ is provided with a toe which engages the end of the lever $k$ and stops the rearward rotation of the gear $l$ in such position as to bring the several slots in the face-plate $i$ and the twister members $h$ and $h'$ into alinement to receive the wires. The front face of the support $e$ is also preferably provided with a slotted face-plate $i''$, secured to the support in such relation as to retain the knife in its guiding-groove and also to guide the wire through the rotary twister after passing around the bundle.

Secured to the front face of the twister-support $e$ and near the upper end thereof are two bundle-clamps, which consist of horizontally-projecting arms formed of telescoping members $m\ m'$, the inner slidable member $m'$ of each of which is firmly clamped in adjusted position by means of a clamping screw and nut $m^2$, the screw passing through the opposite sides of the member $m$ and also through a longitudinal slot in the slidable member $m'$, so that when the nut $m^2$ is set up the sides of the member $m$ are drawn together to hold the member $m'$ rigidly in position.

As hereinbefore referred to, the twister-support $e$ is vertically adjustable in the frame $d$, and the latter in turn is vertically movable in the guides $c'$, fast to the machine-frame. The purpose of the vertical adjustment of the support $e$ is to permit the twister-head to be moved into proper relation near the upper inner edge of the bundle to twist the end of the wire that has been passed around the bundle and the portion of the wire passing over the top of the bundle together. The vertical movement of the sliding frame $d$ and the twister-support $e$ is to permit the clamping-arms $m$ to be elevated sufficiently to allow a bundle to be slid into position and subsequently to bring said arms down into engagement with the top of the bundle to clamp said bundle securely upon the table during the wiring operation.

The vertical adjustment of the support $e$ is effected by means of a rack $f$, secured to the rear face of said support, which rack is engaged by a pinion $g$, mounted upon a transverse shaft $g'$, secured in bearings projecting from the sliding frame $d$, said shaft being provided with a crank $g^2$, by means of which the gear $g$ is rotated to raise or lower the support $e$. When said support $e$ has been adjusted to the desired position, it is locked against further movement on the sliding frame $d$ by means of a set-screw $g^4$, mounted in a collar $g^3$, loosely surrounding the shaft and secured to the frame $d$, so that when said set-screw is turned up the shaft is locked to the sliding frame $d$.

The frame $d$ is normally lifted in the guides $c'$ by means of stout coiled springs $w$, secured at their upper ends to the bridge-piece $c$ and at their lower ends to the bottom of said frame, and downward movement sufficient to bring the clamping-arms $m$ firmly into engagement with the top of the bundle is imparted to the sliding frame by means of a treadle $u$, pivoted at one end to a standard of the machine-frame and connected at a point intermediate its ends by a link $v$ to the bottom of the sliding frame $b$. In order to hold the sliding frame and the twister-support in their depressed relation when the bundle is being wired, the treadle is locked to the machine-frame by means of a ratchet $u'$, which engages with the upper edge of the treadle and holds the treadle in any position to which it may have been moved. The treadle is released and the sliding frame permitted to be elevated by the springs $w$ when said treadle is moved laterally a sufficient distance to disengage it from the locking-ratchet.

The wire with which the bundles are bound or tied is supplied from a reel mounted upon the rear end of the machine-frame, which reel may be revolved in order to permit the wire to be drawn off and passed through the tension-guide, through the slot in the twister, over and around the bundle, thence back through the twister, as indicated in Fig. 1. The tension-guide consists of a rectangular bracket-piece $n$, secured to the face of the support $e$ in such relation as to bring the guide-groove in horizontal alinement with the axis of the twister. On each side of the guide-groove is mounted two hard-metal wearing-rolls $n^2$, and the wire is held in the groove by means of a spring $n'$. It is desirable that the wire be drawn from the reel through the twister substantially in alinement with the twister and the tension-guide in order to prevent undue wear upon the latter and to permit the wire to be readily paid off and taken up by the reel. With this end in view the reel is made vertically adjustable upon the machine-frame in order to accommodate the reel to the various vertical adjustments of the twister. Standards $o$ are slidably mounted on the sides of the uprights $a'$ of the machine-frame and are guided in their movement by yokes or collars $o'$, attached to the said uprights, and by means of longitudinal slots $o^2$ in the lower portions of said standards, through which slots the ends of a transverse shaft $r$ project. The upper ends of the standards $o$ are forked, as at $p$, to form journal-bearings for the reel-shaft $q$, which is held in proper position in said bearings by transverse pins $p'$. The reel-shaft is provided with the usual adjustable pin-plates $p^2$, by means of which the ordinary commercial wire-spool is secured to said shaft. A crank-handle $q'$, attached to the shaft $q$, provides means for rotating said shaft in either direction. When the reel-supporting standards $o$ are to be adjusted vertically, the proper upward movement is imparted to them simultaneously by means of a simple form of winch, consisting of the transverse shaft $r$ and lifting-chains $s$, attached at their respective ends to the projecting ends of the shaft $r$ and the lower ends of the standards $o$, so that when rotatory motion is imparted to said shaft $r$ by a wrench or handle applied to the squared end of said shaft the chains $s$ are wound upon the shaft $r$ and the standards $o$ are simultaneously elevated, after which they are locked in adjusted position by means of a pawl $t'$, engaging a ratchet $t$, fast to said shaft $r$. By releasing the pawl $t'$ from engagement with the ratchet $t$ the standards may be lowered to adjust the height of the reel.

The machine as above described is essentially designed for wiring bundles of flat stock—such as box-shooks, dimension stock, flooring, siding, ceiling, veneers, spool-sticks, hard-wood squares and dimensions, furring-strips, and the like, all of which are adapted to be assembled in square bundles and placed directly upon the table of the machine. By assembling the stock in suitable holders or frames the machine is also capable of wiring bundles of stock that cannot be assembled in squared form—such, for example, as lathes, barrel-shooks, dry staves, and the like.

The operation of the machine is substantially as follows: The set-screw $g^4$ is loosened and the handle $g^2$ revolved to adjust the support $e$ in the sliding frame $d$ so as to permit the bundle to pass freely under the clamping-arms $m$ when the sliding frame $d$ and the support $e$ are moved to their upper position. The set-screw is then turned up to lock the support $e$ to the sliding frame. A bundle of stock assembled in square form or confined in suitable holders is placed upon the rollers $b^2$ and slid across the table until the portion of the bundle about which the wire is to be passed is opposite the twister. Sufficient wire is then brought forward from the reel through the tension-guide and passed through the registering slots in the twister and the face plates $i$ and $i''$, passing thence over the top of the bundle, around said bundle, and back through the twister, leaving a short section of wire projecting beyond the twister. The bundle is then forced up against the front face of the support $e$, the wire pressed down to the bottom of the slots in the twister, and the slack of the wire taken up by the reversing movement of the reel. This reverse movement of the reel permits the wire to be drawn tightly around the bundle. The treadle is now depressed by the foot of the operator until the arms $m$ press the bundle down upon the table with sufficient force to prevent any movement of said bundle upon the table. The gear $l$ is then rotated in a clockwise direction, imparting a rapid rotatory movement to the twister, which twists the strands of the wire together, thereby securely tying the bundle, and as the gear $l$ completes its first rotation the wiper-cam $l^2$ on the shaft $l^3$ of said gear engages the pendular lever $k$ and forces the knife $j$ forward, cutting off the wire just in front of the twister, leaving the ends of the wire surrounding the bundle tied tightly together. During the wiring operation the treadle $u$ is engaged with the rack $u'$ to lock the sliding frame and the twister-support $e$ in depressed position and to hold the clamping-arms $m$ in tight engagement with the bundle. After the twisting operation has been completed the treadle $u$ is released from the ratchet $u'$, and the sliding frame $d$ and the support $e$ are allowed to be returned by the elevating-springs $w$ ready for operation upon the succeeding bundle. After the knife has severed the wire the gear $l$ is rotated rearwardly until it is arrested by the engagement of the toe of the wiper-cam $l^2$ with the end of the pendular lever $k$, thereby bringing the slots in the face-plates, the support $e$, and the twister into registry, so as to permit the wire to be readily laid in the twister. The bundle of stock thus securely wired and tied is removed from the table by sliding it over the rollers $b^2$ and another bundle of stock placed in position for wiring, after which the end of the wire, which still occupies the slot in the twister, is drawn forward and passed around the bundle and back through the twister, and the operation is repeated.

Having thus described our invention, what we claim, and desire to secure by Letters Patent, is—

1. In a bundling-machine, a table for supporting the bundle, a wire-twister, an adjustable support for said twister, a sliding frame in which said support is mounted, means for adjusting the support in the frame, and means for reciprocating the frame and the support.

2. In a bundling-machine, a table for supporting the bundle, a wire-twister, an adjustable support for said twister, a sliding frame in which said support is mounted, clamping-arms on the support adapted to hold the bundle on the table, means for adjusting the support in the frame, and means for reciprocating the frame and the support.

3. In a bundling-machine, a table for supporting the bundle, a wire-twister, an adjustable support for said twister, a sliding frame in which said support is mounted, longitudinally-adjustable arms on the support to engage the bundle and clamp the same on the table, means for adjusting the support in the frame, and means for reciprocating the frame and the support.

4. In a bundling-machine, a table for supporting the bundle, a wire-twister, an adjustable support for said twister, a sliding frame in which said support is mounted, a rack-and-pinion connection between the support and the frame to adjust the support in the frame, and means for reciprocating the frame and the support.

5. In a bundling-machine, a table for supporting the bundle, a wire-twister, an adjustable support for said twister, a sliding frame in which said support is mounted, a rack-and-pinion connection between the support and the frame to adjust the support in the frame, means for locking the rack and pinion against movement, and means for reciprocating the frame and the support.

6. In a bundling-machine, a table for supporting the bundle, a wire-twister, an adjustable support for said twister, a sliding frame in which said support is mounted, a rack-and-pinion connection between the support and the frame to adjust the support in the frame, a treadle for depressing the frame and support, and spring mechanism for elevating the same.

7. In a bundling-machine, a table for supporting the bundle, a wire-twister, an adjustable support for said twister, a sliding frame in which said support is mounted, a rack-and-pinion connection between the support and the frame to adjust the support in the frame, a treadle for depressing the frame and support, spring mechanism for elevating the same, and means for locking said treadle in depressed position.

8. In a bundling-machine, a table for supporting the bundle, a wire-twister, an adjustable support for said twister, a sliding frame in which said support is mounted, a rack-and-pinion connection between the support and the frame to adjust the support in the frame, clamping-arms on the support to hold the bundle on the table, and means for depressing the frame and support.

9. In a bundling-machine, a table for supporting the bundle, a wire-twister, an adjustable support for said twister, a sliding frame in which said support is mounted, a rack-and-pinion connection between the support and the frame to adjust the support in the frame, clamping-arms on the support to hold the bundle on the table, a treadle for depressing the frame and support, and means for locking the parts in depressed position.

10. In a bundling-machine, a stationary table for supporting the bundle, having rollers upon which the bundle is slid into position, said table having a longitudinal clear space between the middle rollers to permit the wire to be passed freely around the bundle.

11. In a bundling-machine, a stationary table for supporting the bundle, having rollers mounted on its top transverse to the path of movement of the bundle, said table having a longitudinal clear space between the middle rollers to permit the wire to be passed freely around the bundle.

12. In a bundling-machine, a table for supporting the bundle, having rollers upon which the bundle is slid into position, a twister-supporting slide, and clamping-arms on said slide adapted to engage the top of the bundle and hold the latter on the table.

13. In a bundling-machine, a table for supporting the bundle, having rollers upon which the bundle is slid into position, a twister-supporting slide, and longitudinally-adjustable clamping-arms on said slide adapted to engage the top of the bundle and hold the latter on the table.

14. In a bundling-machine, a wire-twister, a support in which the same is mounted, a gear-wheel mounted on said support for driving said twister, and a reciprocatory knife on said support operated by the rotation of said gear-wheel to sever the wire after the latter has been twisted.

15. In a bundling-machine, a wire-twister, a support in which the same is mounted, a gear-wheel mounted on said support for driving said twister, a reciprocatory knife on said support operated by the rotation of said gear-wheel to sever the wire after the latter has been twisted, and a cam on the gear-wheel shaft coöperating with said knife to advance the latter to sever the wire after the latter has been twisted.

16. In a bundling-machine, a wire-twister, a support in which the same is mounted, a gear-wheel mounted on said support for driving said twister, a reciprocatory knife on said support operated by the rotation of said gear-wheel to sever the wire after the latter has been twisted, a cam on the gear-wheel shaft, and a pendular detent on the support between the knife and the cam serving to operate the knife as the twister rotates in one direction, and to limit the rotation of the twister and gear in the opposite direction.

17. In a bundling-machine, a wire-twister having a radial slot, a slotted support in which said twister is journaled, a slotted face-plate on the support for securing the twister in position, a reciprocatory knife working in a groove in said support, a slotted face-plate guiding said knife in front of the twister, and a gear-wheel mounted on said support for operating the twister and the knife.

18. In a bundling-machine, a table for supporting the bundle, an adjustable twister-support adjacent thereto, reel-supporting standards slidably mounted on the machine-frame, and a winch on the frame connected to said standards for adjusting the standards vertically.

19. In a bundling-machine, a table for supporting the bundle, a wire-twister, a vertically-adjustable support for said twister, a reciprocatory frame having guides in which said support is slidably mounted, guides on the machine-frame for said frame, a shaft on said frame, a gear on said shaft, a rack on the twister-support meshing with said pinion, a gear on the support for driving the twister, a knife on the support operated by said gear, clamping-arms on the supporting-frame extending over the table, a treadle for depressing the support and the frame carrying the same, and a vertically-adjustable reel.

In testimony whereof we affix our signatures in presence of two witnesses.

ROBERT C. LOWRY.
FRANK A. REYNOLDS.

Witnesses to the signature of Robert C. Lowry:
    JOSEPH MELLON,
    THOS. J. CUNNINGHAME.

Witnesses to the signature of Frank A. Reynolds:
    P. A. KING,
    R. L. OLIVER.